United States Patent
Han et al.

(10) Patent No.: US 10,122,015 B2
(45) Date of Patent: Nov. 6, 2018

(54) POSITIVE ELECTRODE FOR LITHIUM SECONDARY BATTERY AND LITHIUM SECONDARY BATTERY COMPRISING THE SAME

(75) Inventors: Seung-Hun Han, Yongin-si (KR); Jun-Kyu Cha, Yongin-si (KR); Hye-Sun Jeong, Yongin-si (KR); Kwi-Seok Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1033 days.

(21) Appl. No.: 13/370,218

(22) Filed: Feb. 9, 2012

(65) Prior Publication Data
US 2012/0244437 A1 Sep. 27, 2012

Related U.S. Application Data

(60) Provisional application No. 61/466,412, filed on Mar. 22, 2011.

(51) Int. Cl.
*H01M 4/13* (2010.01)
*H01M 4/36* (2006.01)
*H01M 4/525* (2010.01)
*H01M 4/131* (2010.01)
*H01M 4/133* (2010.01)
*H01M 4/587* (2010.01)
*H01M 4/62* (2006.01)

(52) U.S. Cl.
CPC .......... *H01M 4/525* (2013.01); *H01M 4/131* (2013.01); *H01M 4/133* (2013.01); *H01M 4/364* (2013.01); *H01M 4/587* (2013.01); *H01M 4/622* (2013.01)

(58) Field of Classification Search
CPC ...... H01M 4/525; H01M 4/131; H01M 4/133; H01M 4/364
See application file for complete search history.

(56) References Cited

U.S. PATENT DOCUMENTS

| | | | |
|---|---|---|---|
| 2009/0123823 A1* | 5/2009 | Ando | H01M 4/485 429/129 |
| 2010/0112443 A1* | 5/2010 | Blomgren | H01M 4/131 429/221 |
| 2010/0255377 A1 | 10/2010 | Tsubata et al. | |

FOREIGN PATENT DOCUMENTS

| | | |
|---|---|---|
| JP | 2002-203552 A | 7/2002 |
| JP | 2004-103546 | 4/2004 |
| JP | 2007-317582 | 12/2007 |
| JP | 2007-317583 | 12/2007 |

(Continued)

OTHER PUBLICATIONS

Office Action dated May 25, 2016, issued in corresponding KR Application No. 10-2012-22876.

(Continued)

*Primary Examiner* — Ula C Ruddock
*Assistant Examiner* — Frank A Chernow
(74) *Attorney, Agent, or Firm* — Knobbe, Martens, Olson & Bear LLP

(57) ABSTRACT

A positive electrode for a lithium secondary battery is described which includes a lithium transition metal complex oxide including a lithium nickel based complex oxide and/or a lithium cobalt based complex oxide, active carbon having a specific surface area of from about 900 m²/g to about 1600 m²/g, and a water-based binder.

16 Claims, 3 Drawing Sheets

(56) References Cited

FOREIGN PATENT DOCUMENTS

JP       2008-112594     5/2008
KR    1020070059718 A    6/2007

OTHER PUBLICATIONS

Office Action dated Nov. 24, 2016, issued in corresponding KR 10-2012-22876.
Hunuk Kim et al. Synthesis of Defective-Structure $Li_4Mn_5O_{12}$ by Combustion Method and Its Application to Hybrid Capacitor, Journal of the Korean Electrochemical Society, vol. 13, No. 2, 2010, 103-109.

* cited by examiner

POSITIVE ELECTRODE FOR LITHIUM SECONDARY BATTERY AND LITHIUM SECONDARY BATTERY COMPRISING THE SAME

CROSS-REFERENCE TO RELATED APPLICATIONS

This application claims priority under 35 U.S.C. § 119(e) to U.S. Provisional Application No. 61/466,412 filed Mar. 22, 2011, which is hereby incorporated by reference in its entirety.

BACKGROUND

Description of the Related Technology

A non-aqueous system is generally used as an electrode binder used in a lithium secondary battery. In particular, a binder obtained by dissolving polyvinylidene fluoride (PVDF) into N-methyl-2-pyrrolidone (hereinafter, referred to as NMP) or an acetone organic solvent is mainly used.

However, when such a PVDF/NMP non-aqueous system is used as a binder, an organic solvent such as NMP or acetone may contaminate environment and is relatively expensive, thereby increasing a manufacturing cost of a lithium battery. Also, since PVDF has low adhesive strength, more number of binders needs to be used for sufficient binding strength between an electrode plate and an active material.

As such, if the amount of the binder used increases, an amount of electrode active materials decreases and thus a battery may not have large capacity. Also, fluoride of PVDF and lithium ion is subjected to reaction so as to form LiF, which is one of reasons that thermal runaway occurs, and thus stability of a lithium ion battery is reduced. In particular, since a lithium ion battery has high capacity, stability of the battery may not be ensured.

In this regard, in order to solve such a problem, various attempts to use a water-based binder system obtained by dispersing a binder such as styrene butadiene rubber (hereinafter, referred to as "SBR") in water have been made in manufacturing an electrode plate.

A SBR binder may be dispersed in water in an emulsion form so that an organic solvent may not be used and adhesive strength is high. Thus, an amount of a binder may be reduced and an amount of electrode active materials may be increased so that a lithium battery may easily have high capacity. However, even if the water-based binder system is used, a lot of problems occur and thus much improvement is needed in applying the water-based binder system to an electrode so that selecting an electrode active material is limited.

SUMMARY

One or more embodiments include a positive electrode for a lithium secondary battery and a lithium secondary battery including the positive electrode.

According to one or more embodiments, a positive electrode for a lithium secondary battery includes lithium transition metal complex oxide including a lithium nickel based complex oxide and/or lithium cobalt based complex oxide, active carbon having a specific surface area of 900 $m^2/g$ to 1600 $m^2/g$, and a water-based binder.

According to one or more embodiments, a lithium secondary battery includes the positive electrode for a lithium secondary battery.

The lithium battery including the positive electrode described above may have excellent electrode binding strength and low resistivity, prevent generation of a pin hole, and have excellent capacity retention ratio and thus are stabilized.

DETAILED DESCRIPTION

Figure 1:
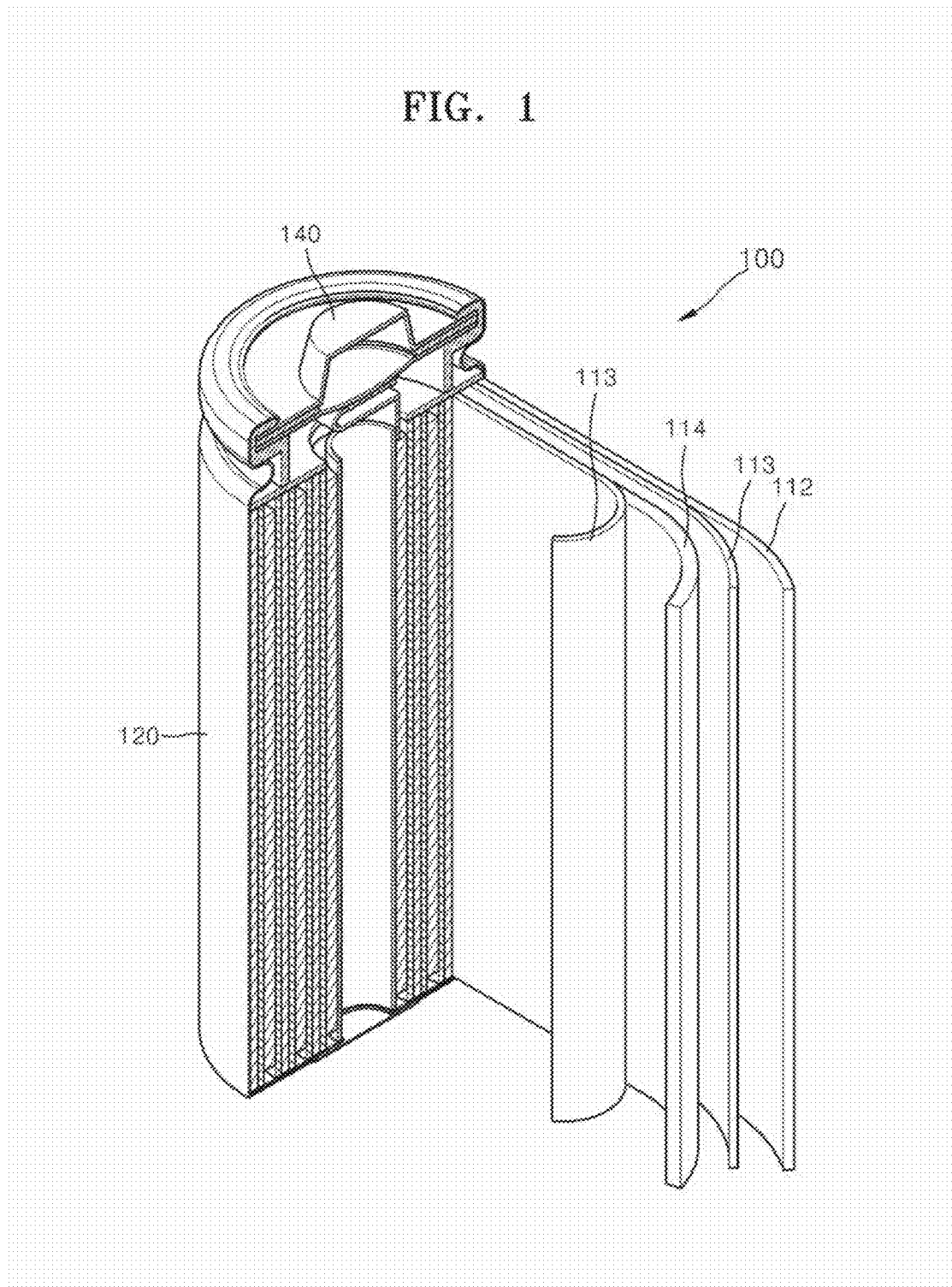
FIG. 1 schematically illustrates a lithium secondary battery according to an embodiment.

A positive electrode for a lithium secondary battery is provided. The positive electrode for a lithium secondary battery includes a lithium transition metal complex oxide including a lithium nickel based complex oxide and/or a lithium cobalt based complex oxide, active carbon having a specific surface area of from about 900 $m^2/g$ to about 1600 $m^2/g$, and a water-based binder.

The active carbon may have a specific surface area of from about 900 $m^2/g$ to about 1600 $m^2/g$, for example, from about 1000 $m^2/g$ to about 1500 $m^2/g$.

When the specific surface area of the active carbon is in the above range, any active carbon used as an electrode material may be used without limiting a type of the active carbon. When the specific surface area of the active carbon is in the above range, adsorptive strength of a hydroxyl group in a positive electrode composition is excellent. Therefore, the positive electrode composition including a lithium transition metal complex oxide that includes a lithium nickel based complex oxide and/or lithium cobalt based complex oxide may be prevented from being basified, thereby preventing corrosion of electrode plate. Additionally, the resistivity characteristic of an electrode is excellent. Since the resistivity characteristic of the electrode is excellent, capacity retention ratio of a battery is excellent.

Even if the lithium nickel based complex oxide and the lithium cobalt based complex oxide are used as the positive electrode active material in the water-based binder system, the positive electrode active material absorbs a hydroxyl group (—OH) by the active carbon having a specific surface area of from about 900 $m^2/g$ to about 1600 $m^2/g$ and thus is prevented from being basified so that corrosion of electrode plate is suppressed and thus capacity retention ratio ix excellent.

When the specific surface area of the active carbon exceeds about 1600 $m^2/g$, a surface area is large and thus the active carbon greatly occupies the volume of the positive active material so that it is hard to realize high capacity density. Also, cohesion between active carbons is generated and thus adsorption effect of a hydroxyl group is deteriorated, thereby reducing capacity.

Also, when the range of the specific surface area of the active carbon is below about 900 $m^2/g$, adsorptive strength for a hydroxyl group (—OH) existing in the positive active material is low and thus it is insufficient to prevent the positive electrode being basified so as to prevent corrosion of electrode plate.

The amount of active carbon having a specific surface area of the above range may be in the range of about 1 to about 10 parts by weight, for example, about 1 through about 5 parts by weight, based on 100 parts by weight of the lithium transition metal complex oxide. When the amount of the active carbon is in the above range, conductivity may be maintained and the positive electrode composition may be prevented from being basified.

An average diameter of the active carbon may be in the range of about 0.03 to about 20 μm, for example, about 5 to about 15 μm, for example, about 10 μm. When the average diameter of the active carbon is in the above range, the capacity of a positive electrode is excellent.

When the active carbon has a specific surface area of the above range, both porous active carbon and non-porous active carbon may be used in the present embodiments. In particular, porous active carbon has a wide specific surface area and thus is more appropriate.

Active carbon obtained by reforming a carbon material using steam activation or melting KOH activation may be used and may include, for example, coconut shell based active carbon, phenol based active carbon, petroleum coke based active carbon, and the like. However, the present embodiments are not limited thereto. The active carbon may include one of above or may be a mixture of at least two of above.

A conducting agent may be further included in the positive electrode.

The active carbon may function as a conducting agent and thus use of the conducting agent may not be required. However, when the conducting agent is used for improving conductivity, an amount of the conducting agent may be in the range of about 1 to about 5 parts by weight, for example, about 1 to about 3 parts by weight, based on 100 parts by weight of the lithium transition metal complex oxide. When the amount of the conducting agent is in the above range, conductivity of the positive electrode is excellent.

The conducting agent is not particularly restricted, as long as the conducting agent does not induce a chemical change to the battery and has conductivity, and may include, for example, graphite such as natural graphite, synthetic graphite; carbon based material such as carbon black, acetylene black, Ketjen black, channel black, furnace black, lamp black, and summer black; conductive fiber such as carbon fiber and metal fiber; metal powder such as fluoro carbon, aluminum, and nickel powder; a conductive whisker such as zinc oxide and potassium titanate; a conductive metal oxide such as titanium oxide; and a conductive material such as a polyphenylene derivative.

A positive electrode, in which a content ratio of the active carbon to the conducting agent is in the range of about 3:1 to about 1:3, is provided. In the above range of the content ratio, the positive electrode composition is prevented from being basified, thereby preventing corrosion of a current collector, and conductivity is excellent. Also, in the above range of the content ratio, a resistivity characteristic of an electrode plate is excellent.

Examples of conducting agent may include acetylene black (Chevron Chemical Company), Denka Black (Denka Singapore Private Limited and Gulf Oil Company), Ketjen-black, EC (Armak Company), Vulcan XC-72 (Cabot Company), and super P (Timcal).

The lithium transition metal complex oxide includes the lithium nickel based complex oxide and/or the lithium cobalt based complex oxide. Examples of the lithium nickel based complex oxide and/or the lithium cobalt based complex oxide may include at least one selected from the group consisting of $LiCoO_2$, $LiNiO_2$, $LiNi_{1-x}Co_xO_2$, $LiNi_{1-X-Y}Co_xM_yO_2$, $LiCo_{1-X}M_XO_2$, and $LiNi_{1-X}M_XO_2$ (0<X<0.5, 0<Y<0.5, M=Al, Fe, Mn, V, Cr, Cu, Ti, W, Ta, Mg, or Mo).

The lithium transition metal complex oxide includes a hydroxyl group on the surface thereof and pH of the lithium transition metal complex oxide is greater or equal to about 11. For example, the pH of the lithium transition metal complex oxide may be in the range of about 11 to about 13, for example, about 11 to about 12.

The pH of the lithium transition metal complex oxide can be measured using pH measuring equipment (Metrohm 827 pH Lab) in such a way that about 50 parts by weight of active material is added to about 50 parts by weight of pure water and about 50 weight % of an active material sample is stirred for about 10 minutes using a stirrer. The result is shown in Table 1 below.

TABLE 1

| pH change of active material aqueous solution | |
|---|---|
| Active material | pH in 50 wt % |
| $LiCoO_2$ | 11.47 |
| $Li[Ni_{1/3}Co_{1/3}Mn_{1/3}]O_2$ | 11.99 |
| $LiNi_{1-X-Y}Al_XM_YO_2$ | 12.01 |

The lithium transition metal complex oxide including the lithium nickel based complex oxide and/or the lithium cobalt based complex oxide used as the positive active material of the present embodiments is basic due to the hydroxyl group (—OH) attached on the surface of the lithium nickel based complex oxide or the lithium cobalt based complex oxide and pH of the lithium transition metal complex oxide exceeds about 11. Thus, the lithium nickel based complex oxide and the lithium cobalt based complex oxide basify the positive electrode composition and thus the electrode plate is corroded. Thus, use of the lithium nickel based complex oxide and the lithium cobalt based complex oxide is limited in a water-based binder system.

In general, aluminum (Al) used as a material of a positive electrode current collector includes an aluminum oxide ($Al_2O_3$) film of about 4 to about 10 nm. In the positive active material having pH of about 11 or below, even if a water-based binder is used, an aluminum oxide ($Al_2O_3$) film is not damaged by corrosion.

However, in the positive active material having pH of about 11 or above, when a water-based binder is used, an aluminum oxide ($Al_2O_3$) film is damaged by reaction represented by Formula (1) below and thus use of the positive active material is limited.

$$Al_2O_3 + H_2O \rightarrow 2AlO^- + 2H^+ \quad (1)$$

Figure 2:
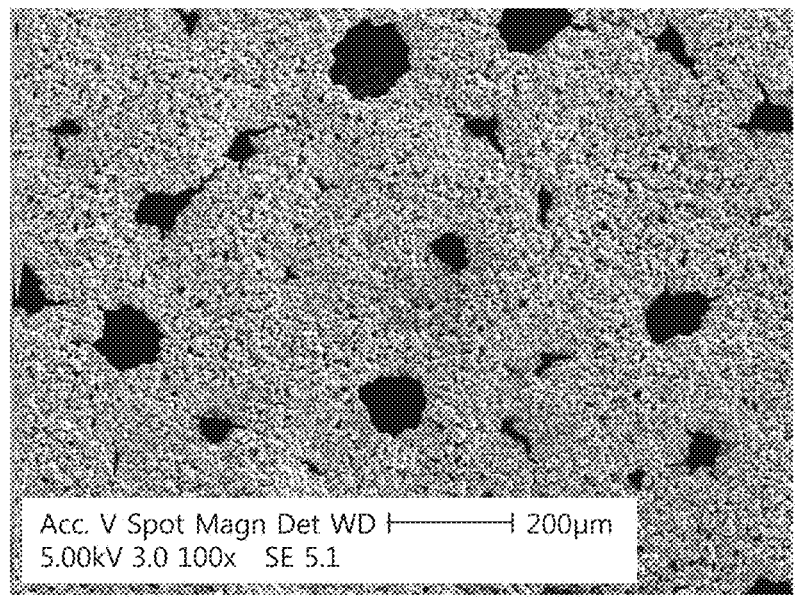
FIG. 2 is a scanning electron microscopic image of a positive electrode surface manufactured according to Comparative Manufacturing Example 1.

When the aluminum oxide ($Al_2O_3$) film is damaged, an aluminum plate at the lower side of the aluminum oxide ($Al_2O_3$) film is oxidized as represented by Formula (2) so that pores are generated, internal resistance increases, a battery capacity is non-uniform, and problems regarding stability may be generated. Such states may be identified in FIG. 2. FIG. 2 illustrates that pores are generated in an aluminum current collector due to damage of the aluminum oxide ($Al_2O_3$) film.

$$2Al + 3H_2O \rightarrow Al_2O_3 + 3H_2\uparrow \quad (2)$$

The active carbon having a specific surface area of 900 m²/g to 1600 m²/g is used to adsorb the hydroxyl group of the lithium transition metal complex oxide to a fine structure of the active carbon, thereby preventing the positive electrode composition being basified in a water-based binder system.

A water-based binder uses water as a solvent or a dispersion medium. Examples of the water-based binder may include, but are not limited to, acrylic resin based binder, styrene butadiene rubber (SBR), carboxymethyl cellulose, polytetrafluorethylene, polyethylene, polypropylene, ethylene-propylene copolymer, polybutadiene, butyl rubber, fluororubber, polyethylene oxide, polyvinylpyrrolidone, polyepichlorohydrin, polyphosphazene, polyacrylonitrile, polystyrene, ethylene propylenediene copolymer, polyvinylpyridine, chlorosulphonated polyethylene, latex, polyester resin, phenol resin, epoxy resin, polyvinyl alcohol, hydroxypropyl cellulose, and mixtures thereof. For example, acrylic resin based binder may be used, and the acrylic resin based binder has great binding strength and less side reaction due to decomposition of the binder while charging the positive electrode.

The water-based binder may be used in the form of solid content. More specifically, solid content of the water-based binder may be water dispersed in an emulsion form.

An amount that is generally used in manufacturing of an electrode may be used as an amount of the water-based binder, and adhesive strength of the water-based binder is more excellent than a non-aqueous binder so that the water-based binder may be less included and thus an amount of positive active material may be increased, thereby increasing a capacity of the battery.

The amount of the water-based binder may be in the range of about 1 to about 5 parts by weight based on 100 parts by weight of the lithium complex oxide; however, the present embodiments are not limited thereto. In the above range, the capacity of the positive active material may not be deteriorated and adhesive strength of the binder is excellent.

A positive electrode for a lithium secondary battery including the lithium transition metal complex oxide that includes a lithium nickel based complex oxide and/or a lithium cobalt based complex oxide, active carbon having a specific surface area of about 900 m²/g to about 1600 m²/g, a conducting agent, and a water-based binder may be provided as follows.

The lithium transition metal complex oxide including the lithium nickel based complex oxide and/or the lithium cobalt based complex oxide, the active carbon having a specific surface area of from about 900 m²/g to about 1600 m²/g, the water-based binder, and a solvent are mixed to prepare a positive electrode composition, and the positive electrode composition is coated on a current collector and is dried so as to prepare a positive electrode. Also, the conducting agent may be further included in the positive electrode composition. A current collector that is generally used in a positive electrode may be used as the current collector. Examples of the current collector may include aluminum (Al); however, the present embodiments are not limited thereto.

The lithium transition metal complex oxide including the lithium nickel based complex oxide and/or the lithium cobalt based complex oxide, the active carbon having a specific surface area of from about 900 m²/g to about 1600 m²/g, and the water-based binder may be mixed in a mixing ratio that is generally used in manufacturing of a positive electrode composition. The mixing ratio may vary according to the type of the positive active material and the conducting agent binder; however, the present embodiments are not limited thereto.

The water-based binder may be included in the form of solid content while preparing the positive electrode composition, and may be mixed in water to be added to the positive electrode composition.

An amount of the active carbon may vary according to the type of the lithium transition metal complex oxide, which is a positive active material, and pH thereof.

The solvent may be selected from solvents that may be used in a general composition for an active material layer, and may include, for example, chain type carbonate such as dimethyl carbonate, ethyl methyl carbonate, diethyl carbonate, and dipropyl carbonate; cyclic carbonate such as dimethoxyethane, diethoxyethane, a fatty acid ester derivative, ethylene carbonate, propylene carbonate, and butylene carbonate; gamma-butyrolactone; N-methyl pyrrolidone (NMP); acetone; and water. Here, at least two of the above may be combined to be used as the solvent.

A lithium secondary battery including a positive electrode, a negative electrode, and a separator according to an embodiment is provided.

For example, the lithium secondary battery may be manufactured as follows. Firstly, the positive electrode for a lithium secondary battery including the lithium transition metal complex oxide including the lithium nickel based complex oxide and/or the lithium cobalt based complex oxide, the active carbon having a specific surface area of about 900 m²/g to about 1600 m²/g, the conducting agent, and the water-based binder is prepared.

Then, any negative electrode of the lithium secondary battery that is generally used may be used as the negative electrode.

For example, the negative electrode may be manufactured by mixing a negative active material, the conducting agent, the binder, and a solvent so as to prepare a negative active material composition, directly coating or casting the negative active material composition on a copper current collector or a separate support, and laminating a negative active material film separated from the support on the copper current collector, thereby obtaining a negative electrode plate. Here, amounts of the negative active material, the conducting agent, the binder, and the solvent are the amounts generally used in a lithium battery.

Examples of the negative active material may include a lithium metal, a lithium alloy, a carbon material, or graphite. In the negative active material composition, the conducting agent, the binder, and the solvent may be the same as those of the positive electrode. In some cases, a plasticizer may be further added to the positive active material composition and the negative active material composition so as to form pores in an electrode plate.

The conducting agent, the binder, and the solvent used in the negative active material composition may be those generally used in manufacturing of an electrode composition and examples thereof are described above in the positive electrode.

The separator is as follows.

Any separator that is generally used in a lithium battery may be used. In particular, the separator may have low resistance with respect to ion mobility of an electrolyte, and excellent electrolyte moisturizing capability. For example, the separator may include at least one selected from the group consisting of glass fiber, polyester, Teflon, polyethylene, polypropylene, polytetrafluoroethylene (PTFE), and mixtures thereof. Also, the separator may be in the form of non-woven fabric or woven fabric. More specifically, in a lithium ion battery, a windable separator comprising polyethylene or polypropylene is used, and in a lithium ion polymer batter, a separator having excellent organic electrolyte impregnation capability may be used.

The electrolyte is as follows.

The electrolyte may include a non-aqueous organic solvent and lithium salt. Also, if necessary, various additives such as an anti-overcharging agent may be included in the electrolyte.

The non-aqueous organic solvent may function as a medium which moves ions that participate electrochemical reaction of the battery.

The non-aqueous organic solvent may include a carbonate-based solvent, an ester-based solvent, an ether-based solvent, a ketone-based solvent, an alcohol-based solvent, or an aprotic-based solvent. Examples of the carbonate-based solvent may include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (PC), butylene carbonate (BC), and ethyl methyl carbonate (EMC). Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent may include dibutyl ether, tetraglyme, diglyme, dimethoxy ethane, 2-methyltetrahydrofurn, and tetrahydrofurn. Examples of the ketone-based solvent may include cyclohexanone. Examples of the alcohol-based solvent may include ethyl alcohol and isopropyl alcohol. Examples of the aprotic-based solvent may include nitriles such as R—CN (R is a linear, branched, or ring-structured hydrocarbon group having carbon numbers of about 2 to 20 and may include double bond aromatic ring or ether bond; amides such as dimethyl formamide; dioxolanes such as 1,3-dioxolane; and sulfolanes.

The non-aqueous organic solvent may be used alone or may be used by mixing at least one solvent. A mixing ratio used when at least one solvent is mixed may be appropriately controlled according to desired performance of the battery and is well known to one of ordinary skill in the art to which the present embodiments pertain.

The lithium salt is dissolved in an organic solvent so as to function as a supply source of lithium ions in the battery. Thus, the lithium salt allows basic operation of a lithium battery and facilitates movement of lithium ions between the positive electrode and the negative electrode. In the lithium salt, one or at least two selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$ (lithium bis(oxalato) borate; LiBOB) may be included as a supporting electrolytic salt. A concentration of the lithium salt may be in the range of about 0.1 to 2.0 M. When the concentration of the lithium salt is in the above range, an electrolyte may have appropriate conductivity and viscosity so that electrolyte performance may be excellent and lithium ions may be efficiently moved.

A battery structure is manufactured by disposing the separator between the positive electrode and the negative electrode. Such a battery structure is wound or folded to be inserted into a cylindrical battery case or a square-shaped battery case and then an organic electrolyte is injected into the case, thereby completing manufacture of a lithium ion battery. Also, the battery structure is stacked in a bi-cell structure and is impregnated with an organic electrolyte. The obtained resultant is put in a pouch and is sealed, thereby completing manufacture of a lithium ion polymer battery.

FIG. 1 schematically illustrates a lithium secondary battery 100 according to an embodiment.

Referring to FIG. 1, the lithium secondary battery 100 includes a positive electrode 114, a negative electrode 112, a separator 113 interposed between the positive electrode 114 and the negative electrode 112, an electrolyte (not illustrated) impregnated with the positive electrode 114, the negative electrode 112, and the separator 113, a battery case 120, and a sealing member 140 for sealing the battery case 120. The lithium secondary battery 100 of FIG. 1 is configured by sequentially stacking the positive electrode 114, the negative electrode 112, and the separator 113 and then inserting the positive electrode 114, the negative electrode 112, and the separator 113 into the battery case 120 while the positive electrode 114, the negative electrode 112, and the separator 113 are wound spirally.

Hereinafter, one or more embodiments will be described more fully with reference to Examples and Comparative Examples. These Examples are for purposes of describing example embodiments and should not be construed as limited to only the Examples set forth herein.

<Manufacturing Example 1> Manufacturing of a Positive Electrode (Active Carbon Having a Specific Surface Area of 1430 $m^2$/g:Conducting Agent=1.63:2.72

100 parts by weight of $Li[Ni_{1/3}Co_{1/3}Mn_{1/3}]O_2$ having pH of 11.99, 1.63 parts by weight of active carbon having an average diameter of 10 μm and a specific surface area of 1430 $m^2$/g, 2.72 parts by weight of Denka black as a conducting agent, 1.09 parts by weight of carboxymethyl cellulose, and 8.15 parts by weight of acrylate copolymer emulsion (AX-4069, Zeon corporation, Japan) having solid content of 40 wt %, which is a water-based binder, were added to 42 parts by weight of water so as to prepare a positive electrode composition. The positive electrode composition is coated on an aluminum film so as to form a thin electrode plate. Then, the thin electrode plate was dried for about 12 hours at 110° C. and was rolled, thereby manufacturing a positive electrode.

<Manufacturing Example 2> Manufacturing of a Positive Electrode (Active Carbon Having a Specific Surface Area of 1430 $m^2$/g:Conducting Agent=2.17:2.17

100 parts by weight of $Li[Ni_{1/3}Co_{1/3}Mn_{1/3}]O_2$ having pH of 11.99, 2.17 parts by weight of active carbon having an average diameter of 10 μm and a specific surface area of 1430 $m^2$/g, 2.17 parts by weight of Denka black as a conducting agent, 1.09 parts by weight of carboxymethyl cellulose, and 8.15 parts by weight of acrylate copolymer emulsion (AX-4069, Zeon corporation, Japan) having solid content of 40 wt %, which is a water-based binder, were added to 42 parts by weight of water so as to prepare a positive electrode composition. The positive electrode composition is coated on an aluminum film so as to form a thin electrode plate. Then, the thin electrode plate was dried for about 12 hours at 110° C. and was rolled, thereby manufacturing a positive electrode.

<Manufacturing Example 3> Manufacturing of a Positive Electrode (Active Carbon Having a Specific Surface Area of 1430 m²/g:Conducting Agent=2.72:1.63

100 parts by weight of Li[Ni$_{1/3}$Co$_{1/3}$Mn$_{1/3}$]O$_2$ having pH of 11.99, 2.72 parts by weight of active carbon having an average diameter of 10 μm and a specific surface area of 1430 m²/g, 1.63 parts by weight of Denka black as a conducting agent, 1.09 parts by weight of carboxymethyl cellulose, and 8.15 parts by weight of acrylate copolymer emulsion (AX-4069, Zeon corporation, Japan) having solid content of 40 wt %, which is a water-based binder, were added to 42 parts by weight of water so as to prepare a positive electrode composition. The positive electrode composition is coated on an aluminum film so as to form a thin electrode plate. Then, the thin electrode plate was dried for about 12 hours at 110° C. and was rolled, thereby manufacturing a positive electrode.

<Manufacturing Example 4> Manufacturing of a Positive Electrode (Active Carbon Having a Specific Surface area of 1270 m²/g:Conducting Agent=1.63:2.72

A positive electrode was manufactured in the same manner as in Manufacturing Example 1, except that the active carbon having a specific surface area of 1270 m²/g was used.

<Manufacturing Example 5> Manufacturing of a Positive Electrode (Active Carbon Having a Specific Surface Area of 1270 m²/g:Conducting Agent=2.17:2.17

A positive electrode was manufactured in the same manner as in Manufacturing Example 2, except that the active carbon having a specific surface area of 1270 m²/g was used.

<Manufacturing Example 6> Manufacturing of a Positive Electrode (Active Carbon Having a Specific Surface Area of 1270 m²/g:Conducting Agent=2.72:1.63

A positive electrode was manufactured in the same manner as in Manufacturing Example 3, except that the active carbon having a specific surface area of 1270 m²/g was used.

<Comparative Manufacturing Example 1> Manufacturing of a Positive Electrode (When Active Carbon is Not Used 100 parts by weight of Li[Ni$_{1/3}$Co$_{1/3}$Mn$_{1/3}$]O$_2$ having pH of 11.99, 4.35 parts by weight of Denka black as a conducting agent, 1.09 parts by weight of carboxymethyl cellulose, and 8.15 parts by weight of acrylate copolymer emulsion (AX-4069, Zeon corporation, Japan) having solid content of 40 wt %, which is a water-based binder, were added to 42 parts by weight of water so as to prepare a positive electrode composition. The positive electrode composition is coated on an aluminum film so as to form a thin electrode plate. Then, the thin electrode plate was dried for about 12 hours at 110° C. and was rolled, thereby manufacturing a positive electrode.

<Comparative Manufacturing Example 2> Use of Active Carbon Having a Specific Surface Area of 800 m²/g 100 parts by weight of Li[Ni$_{1/3}$Co$_{1/3}$Mn$_{1/3}$]O$_2$ having pH of 11.99, 15 parts by weight of active carbon having an average diameter of 10 μm and a specific surface area of 800 m²/g, 1.09 parts by weight of carboxymethyl cellulose, and 8.15 parts by weight of acrylate copolymer emulsion (AX-4069, Zeon corporation, Japan) having solid content of 40 wt %, which is a water-based binder, were added to 42 parts by weight of water so as to prepare a positive electrode composition. The positive electrode composition is coated on an aluminum film so as to form a thin electrode plate. Then, the thin electrode plate was dried for about 12 hours at 110° C. and was rolled, thereby manufacturing a positive electrode.

Figure 3:
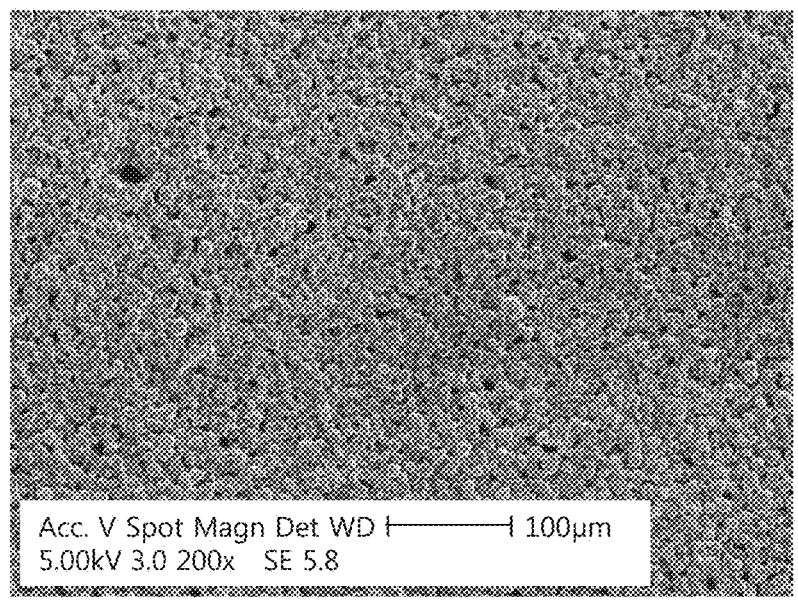
FIG. 3 is a scanning electron microscopic image of a positive electrode surface manufactured according to Manufacturing Example 2.
Figure 4:
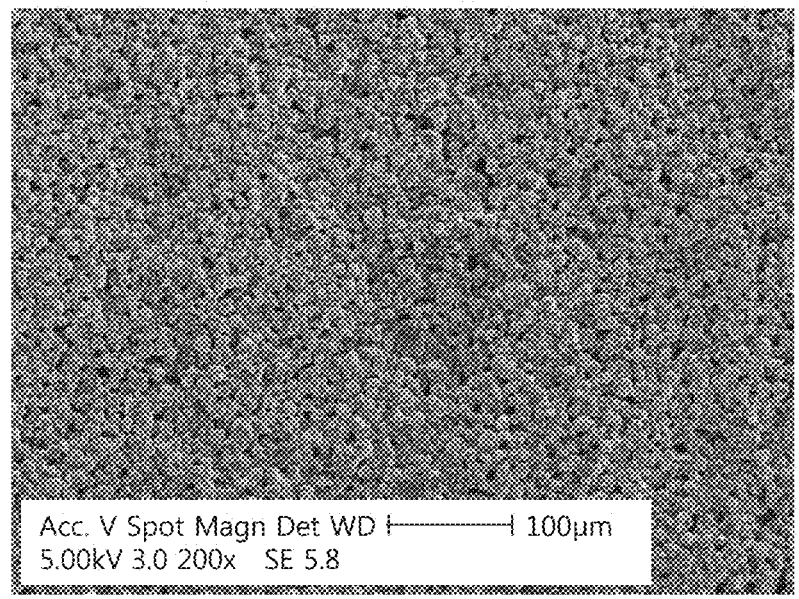
FIG. 4 is a scanning electron microscopic image of a positive electrode surface manufactured according to Manufacturing Example 3.

Surface states for the positive electrodes manufactured according to Comparative Manufacturing Example, 1, Manufacturing Example 2, and Manufacturing Example 3 were examined by using a scanning electron microscope (SEM) and results are shown in FIGS. 2 through 4.

FIG. 2 is a scanning electron microscopic image of the surface of the positive electrode manufactured according to Comparative Manufacturing Example 1. As illustrated in FIG. 2, a plurality of pin holes are formed in the positive electrode.

However, in the positive electrodes manufactured according to Manufacturing Examples 2 and 3, when the surfaces of the positive electrodes are examined by using a SEM, pin holes are hardly found.

<Example 1> Manufacturing of a Coin Cell

A coil cell was manufactured by using the positive electrode manufactured according to Manufacturing Example 1, a lithium metal as a negative electrode, a separator (polypropylenes) having a thickness of about 10 to about 20 μm (thickness: about 15 μm), and an electrolyte obtained by dissolving 1.10 M of LiPF$_6$ into a mixture solvent having a volume ratio of EC:EMC:DEC of 3:3:4.

<Examples 2 Through 6> Manufacturing of a Coin Cell

Coin cells were manufactured in the same manner as in Example 1, except that the positive electrodes manufactured according to Manufacturing Examples 2 through 6 were used, respectively.

<Comparative Examples 1 AND 2> Manufacturing of a Coin Cell

Coin cells were manufactured in the same manner as in Example 1, except that the positive electrodes manufactured according to Comparative Manufacturing Examples 1 and 2 were used, respectively.

<Evaluation Example> Evaluation on Charge/Discharge Characteristics

The coil cells manufactured according to Examples 1 through 6 and Comparative Examples 1 and 2 were charged and discharged for 100 times at a constant current of 4.4 mA/g (1.0 C rate) in the voltage range of about 3.0 to about 4.3V at 25° C. The resultant is shown in Table 2. A capacity retention ratio is represented by Equation 1.
<Equation 1>
Capacity and charge/discharge efficiency were evaluated using capacity retention ratio [%]=[discharge capacity at 100$^{th}$ cycle/discharge capacity at 1$^{st}$ cycle]×100 and the result is shown in Table 2 and FIG. 2.

TABLE 2 capacity retention ratio evaluation result

| | capacity retention ratio @100 C(%) |
|---|---|
| Example 1 | 82.7% |
| Example 2 | 81.7% |
| Example 3 | 79.8% |
| Example 4 | 79.5% |
| Example 5 | 78.5% |
| Example 6 | 77.8% |
| Comparative Example 1 | 65.5% |
| Comparative Example 2 | 66.3% |

As shown in Table 2, the lithium secondary batteries manufactured according to Examples 1 through 6, in which the active carbon having a specific surface area in a specific range and the conducting agent are mixed in an appropriate ratio, have improved capacity retention ratio compared with the lithium secondary batteries manufactured according to Comparative Examples 1 and 2, in which the active carbon or the conducting agent is only used.

What is claimed is:

1. A positive electrode for a lithium battery comprising:

$LiNi_{1-x-y}Co_xMn_yO_2$, wherein $0<x<0.5$, $0<y<0.5$;
active carbon having a specific surface area of from about 1250 m$^2$/g to about 1450 m$^2$/g;
a water-based binder comprising acrylic resin based binder and
a conducting agent,
wherein a content ratio of the active carbon to the conducting agent is from about 1.6:1 to about 1:1.6.

2. The positive electrode of claim 1, wherein the active carbon is in an amount from about 1 to about 10 parts by weight based on 100 parts by weight of the lithium transition metal complex oxide.

3. The positive electrode of claim 1, wherein the active carbon is in an amount from about 1 to about 5 parts by weight based on 100 parts by weight of the lithium transition metal complex oxide.

4. The positive electrode of claim 1, wherein the active carbon has an average diameter of from about 0.03 to about 20 μm.

5. The positive electrode of claim 1, wherein the active carbon has an average diameter of from about 5 to about 15 μm.

6. The positive electrode of claim 1, wherein the active carbon has an average diameter of about 10 μm.

7. The positive electrode of claim 1, wherein the lithium transition metal complex oxide has a pH of from about 11 to about 13.

8. The positive electrode of claim 1, wherein the water-based binder comprises acrylate copolymer emulsion.

9. The positive electrode of claim 1, wherein the conducting agent is in an amount of from about 1 to about 5 parts by weight based on 100 parts by weight of the lithium transition metal complex oxide.

10. The positive electrode of claim 9, wherein the conducting agent is at least one selected from the group consisting of graphite, natural graphite, synthetic graphite, carbon black, acetylene black, Denka Black, Ketjen black, channel black, furnace black, lamp black, conductive fiber, carbon fiber, metal fiber; metal powder, fluorocarbon powder, aluminum powder, nickel powder, a conductive whisker, zinc oxide, potassium titanate, a conductive metal oxide, titanium oxide and a polyphenylene derivative.

11. A lithium secondary battery comprising:
a positive electrode,
a negative electrode,
and a separator,
wherein the positive electrode comprises:
active carbon having a specific surface area of from about 1250 m$^2$/g to about 1450 m$^2$/g;
a water-based binder comprising acrylic resin based binder;

$LiNi_{1-x-y}Co_xMn_yO_2$, wherein $0<x<0.5$, $0<y<0.5$; and
a conducting agent,
wherein a content ratio of the active carbon to the conducting agent is from about 1.6:1 to about 1:1.6.

12. The lithium secondary battery of claim 11, wherein the active carbon is from about 1 to about 10 parts by weight based on 100 parts by weight of the lithium transition metal complex oxide.

13. The lithium secondary battery of claim 11, wherein the active carbon has an average diameter of from about 0.03 to about 20 μm.

14. The lithium secondary battery of claim 11, wherein the water-based binder comprises acrylate copolymer emulsion.

15. The lithium secondary battery of claim 11, wherein the conducting agent is in an amount of from about 1 to about 5 parts by weight based on 100 parts by weight of the lithium transition metal complex oxide.

16. The lithium secondary battery of claim 15, wherein the conducting agent is at least one selected from the group consisting of graphite, natural graphite, synthetic graphite, carbon black, acetylene black, Denka Black, Ketjen black, channel black, furnace black, lamp black, conductive fiber, carbon fiber, metal fiber; metal powder, fluorocarbon powder, aluminum powder, nickel powder, a conductive whisker, zinc oxide, potassium titanate, a conductive metal oxide, titanium oxide and a polyphenylene derivative.

* * * * *